(12) United States Patent
Shrestha

(10) Patent No.: US 12,481,943 B2
(45) Date of Patent: Nov. 25, 2025

(54) SYSTEM AND METHOD FOR MONITORING THE LOCATION OF WORKERS IN A WORKSITE TO ENHANCE SAFETY AND PRODUCTIVITY

(71) Applicant: Niran Shrestha, Brooklyn, NY (US)

(72) Inventor: Niran Shrestha, Brooklyn, NY (US)

( * ) Notice: Subject to any disclaimer, the term of this patent is extended or adjusted under 35 U.S.C. 154(b) by 370 days.

(21) Appl. No.: 17/966,685

(22) Filed: Oct. 14, 2022

(65) Prior Publication Data

US 2023/0031942 A1 Feb. 2, 2023

Related U.S. Application Data

(63) Continuation-in-part of application No. 17/407,769, filed on Aug. 20, 2021, now abandoned.

(60) Provisional application No. 63/068,275, filed on Aug. 20, 2020.

(51) Int. Cl.
*G01S 5/02* (2010.01)
*G01S 5/14* (2006.01)
*G06Q 10/06* (2023.01)
*G06Q 10/0631* (2023.01)

(52) U.S. Cl.
CPC .... *G06Q 10/063114* (2013.01); *G01S 5/0295* (2020.05); *G01S 5/14* (2013.01); *G01S 2205/09* (2020.05)

(58) Field of Classification Search
CPC ...... G01S 5/0295; G01S 5/14; G01S 2205/09; G06Q 10/063114

USPC ......................................................... 342/386
See application file for complete search history.

(56) References Cited

U.S. PATENT DOCUMENTS

| | | | |
|---|---|---|---|
| 10,528,902 B2 | 1/2020 | Morgenthau | |
| 11,308,950 B2 * | 4/2022 | Mann | H04L 67/10 |
| 2017/0301039 A1 | 10/2017 | Dyer et al. | |
| 2021/0158207 A1 | 5/2021 | Alsahlawi et al. | |
| 2025/0016126 A1 * | 1/2025 | Boyd | H04L 51/046 |

FOREIGN PATENT DOCUMENTS

| | | | | | |
|---|---|---|---|---|---|
| CN | 108029069 A | * | 5/2018 | ......... | G06Q 10/0833 |
| CN | 110100187 A | * | 8/2019 | ............... | G01S 1/68 |
| GB | 2560510 A | * | 9/2018 | ............. | G01C 21/16 |

* cited by examiner

*Primary Examiner* — Harry K Liu

(57) ABSTRACT

A system and a method for monitoring the location of workers in a worksite to enhance safety and productivity are used to facilitate the monitoring of every worker to determine the individual performance and the condition of the worker. A present signal is broadcasted with each wearable beacon from a plurality of wearable beacons. The present signal from an arbitrary beacon is received with a proximal detector from a plurality of proximal detectors. The present signal of the arbitrary beacon is relayed from the proximal detector to a remote server. A current approximate location of the arbitrary beacon from the worksite location of the proximal detector is assessed. The current approximate location of the arbitrary beacon is logged into a location history of the arbitrary beacon with the remote server. Then, a plurality of iterations for the process is executed to continuously monitor the location and condition of each worker.

17 Claims, 19 Drawing Sheets

SYSTEM AND METHOD FOR MONITORING THE LOCATION OF WORKERS IN A WORKSITE TO ENHANCE SAFETY AND PRODUCTIVITY

The current application is a continuation-in-part (CIP) application of a U.S. non-provisional application Ser. No. 17/407,769 filed on Aug. 20, 2021. The U.S. non-provisional application Ser. No. 17/407,769 claims a priority to a U.S. provisional application Ser. No. 63/068,275 filed on Aug. 20, 2020.

FIELD OF THE INVENTION

The present invention generally relates to systems and methods for increasing the safety and productivity of workers. More specifically, the present invention provides a system and a method that enables the improvement of safety and productivity in a worksite by monitoring the location of the workers.

BACKGROUND OF THE INVENTION

There are many issues with worker location awareness, safety, and productivity in the construction industry. Construction sites are usually prone to accidents or hazards that can result in injuries to the workers. In addition, the project management is often notified of the accidents too late, which can result in dangerous consequences. By getting notified early of any accident, the project management can quickly take any necessary action that could potentially save the lives of the workers involved in the accident. Another issue with construction projects is the lack of productivity analysis for the individual worker since productivity is usually not calculated for each worker. Individual worker productivity tracking can be costly and time consuming, which makes tracking the performance of each worker unpractical. However, by tracking the individual worker productivity, the project management can better analyze the overall performance of the workforce and make the appropriate allocations to the project. There is a need for a better solution that helps project management monitor the workers' location and individual productivity in a worksite.

Therefore, an objective of the present invention is to provide a system and a method for monitoring the location of workers in a worksite to enhance safety and productivity. The present invention utilizes Internet of Things (IoT) and Artificial Intelligence (AI) to enhance location awareness, safety, and productivity in the construction industry. Another objective of the present invention is to provide a system and a method that enables the monitoring and tracking of every worker at the worksite to determine their overall work and health condition. The present invention enables the individual monitoring of every worker in a worksite to determine the productivity of the worker as well as to detect any possible accidents that the workers may be involved in. Additional features and benefits of the present invention are further discussed in the sections below.

SUMMARY OF THE INVENTION

The present invention provides a system and a method for monitoring the location of workers in a worksite to enhance safety and productivity (i.e., Kwant AI). The present invention utilizes several wearable beacons to be worn on the worksite by every subject entering the worksite. The wearable beacons include, but are not limited to, smart devices that can be comfortably and safely worn by each worker. Each wearable beacon has several sensors incorporated within as well as a unique identification (ID) code. In addition, the wearable beacons are linked to a stationary detector (i.e., Kwant) that is placed on the construction site and is connected to a router. The data transmitted to the router from the stationary detector is collected and sent to the remote servers on a cloud computing platform. The data stored on the remote servers can be accessed through a user dashboard where authorized users can perform various tasks or actions to monitor the actions and performance of the individual workers. In addition, the authorized users can be notified of any emergency or similar situation where management or other authorized users need to intervene.

DETAIL DESCRIPTIONS OF THE INVENTION

All illustrations of the drawings are for the purpose of describing selected versions of the present invention and are not intended to limit the scope of the present invention.

Figure 1:
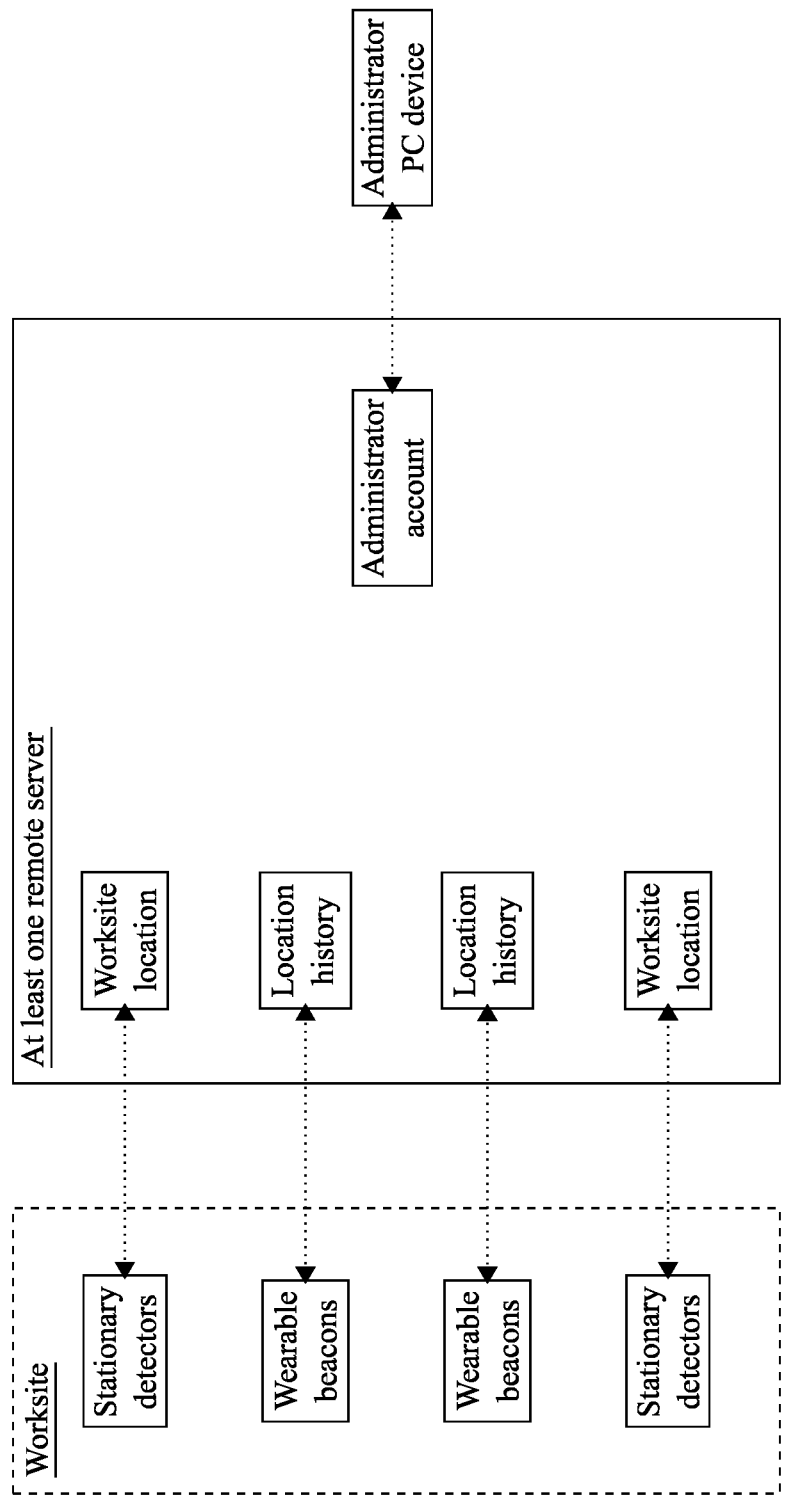
FIG. 1 is a diagram illustrating the overall system of the present invention.

The present invention is a system and a method for monitoring the location of workers in a worksite to enhance safety and productivity. The present invention facilitates the monitoring of every worker to determine the individual performance and the condition of the worker throughout the workday. As can be seen in FIG. 1, the system of the present invention includes a plurality of wearable beacons, a plurality of stationary detectors, and at least one remote server (Step A). The wearable beacons can be worn by each worker in the worksite to enable the remote and real-time monitoring of each worker. The stationary detectors track the location of the wearable beacons that are in proximity to the stationary beacons. In addition, the stationary detectors are distributed throughout the worksite to track the position of the wearable beacons worn by the workers. The at least one remote server collects the data captured by the stationary detectors from the wearable beacons to perform the analysis necessary to determine the location, performance, and condition of each worker in the worksite. Further, the remote server stores a worksite location for each stationary detector that facilitates the tracking of the wearable beacons. The remote server also manages a location history for each wearable beacon that can be used to analyze the individual performance of the corresponding worker. Together, the wearable beacons, the stationary detectors, and the remote server facilitate the remote tracking of each worker to determine the work status and the condition of the worker.

Figure 2:
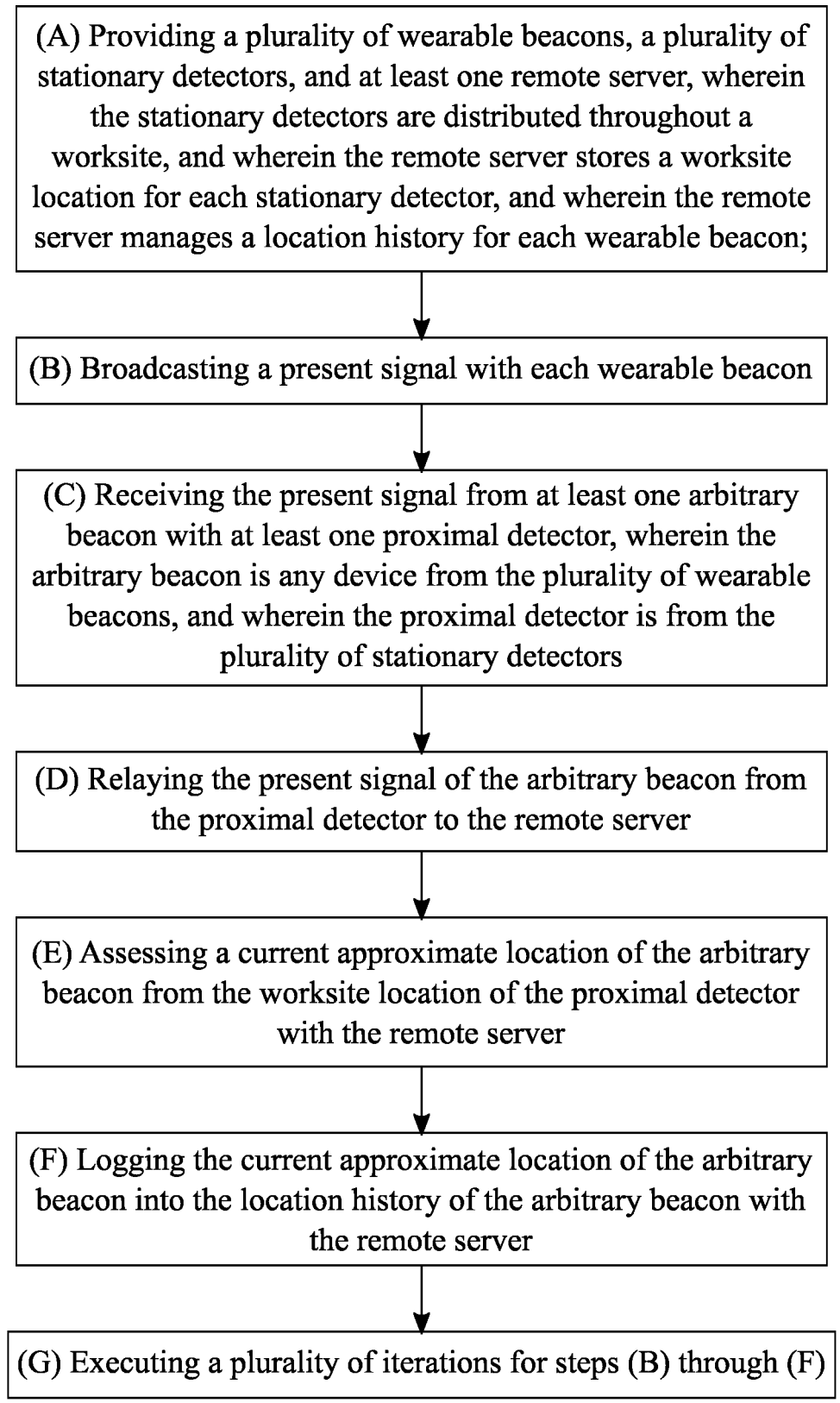
FIG. 2 is a flowchart showing the overall process of the method of the present invention.

An overall process for the method of the plurality invention facilitates the remote and automatic monitoring of each worker to improve productivity of the workforce as well as to immediately detect any accidents that can occur at the worksite. As can be seen in FIG. 2, the overall process begins by broadcasting a present signal with each wearable beacon (Step B). The present signal enables the detection of each wearable beacon by one or more proximal detectors. The present signal from at least one arbitrary beacon is then received with at least one proximal detector (Step C). The arbitrary beacon is any beacon from the plurality of wearable beacons, and the proximal detector is from the plurality of stationary detectors. In other words, one or more wearable beacons can be detected by the same proximal detector. Likewise, a wearable beacon can be detected by multiple proximal detectors. The overall process continues by relaying the present signal of the arbitrary beacon from the proximal detector to the remote server (Step D). The present signal is transmitted using the one or more proximal detectors that detected the presence of the arbitrary beacon. Afterwards, a current approximate location of the arbitrary beacon is assessed from the worksite location of the proximal detector with the remote server (Step E). The current approximate location of the arbitrary beacon helps locate the worker at the worksite for performance purposes as well as to monitor potential hazard situations that can affect the worker. The current approximate location of the arbitrary beacon is then logged into the location history of the arbitrary beacon with the remote server (Step F). The location history of the worker enables a more accurate analysis of the worker's performance in order to determine ways to improve productivity in the workplace. The overall process concludes by executing a plurality of iterations for Steps B through F (Step G). The execution of multiple iterations enables the continuous monitoring of the workers during the workday so that the location and performance of each worker can be tracked throughout the workday.

Figure 3:
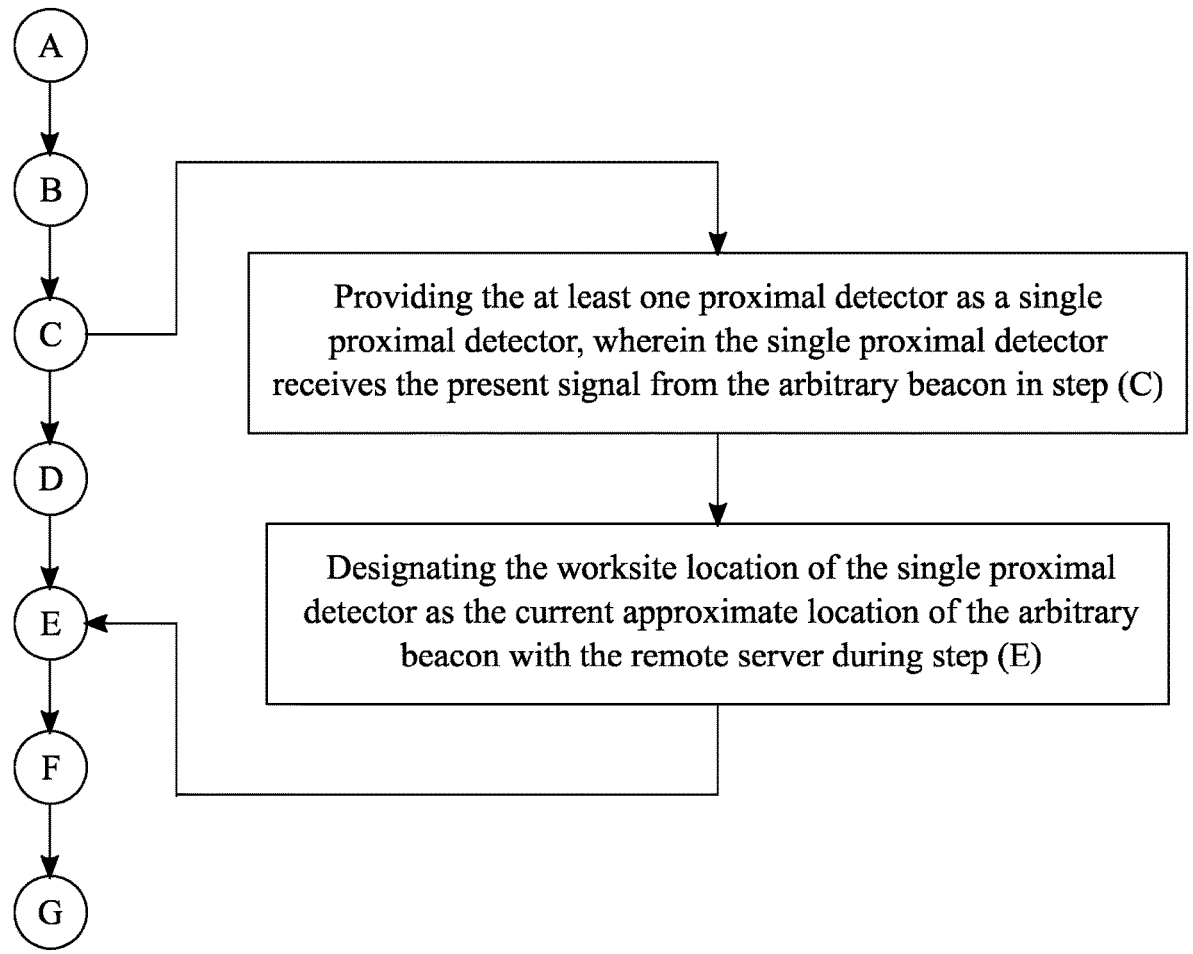
FIG. 3 is a flowchart showing the subprocess of determining the location of the arbitrary beacon with a single proximal detector.

As previously discussed, the wearable beacons can be detected by one or more stationary detectors as the users wearing the wearable beacons move throughout the worksite. For example, in an open space, such as the main floor, the arbitrary beacon can be in proximity to multiple proximal detectors. However, in narrower or far spaces in the worksite such as an emergency exit, the wearable beacons may be in proximity to a single proximal detector. In the situation where a single stationary detector is near the arbitrary beacon, the at least one proximal detector is provided as a single proximal detector. As can be seen in FIG. 3, the single proximal detector receives the present signal from the arbitrary beacon in Step C so that the arbitrary beacon can still be monitored and tracked. Further, the subprocess of determining the location of the arbitrary beacon with a single proximal detector involves the step of designating the worksite location of the single proximal detector as the current approximate location of the arbitrary beacon with the remote server during Step E. In other words, the worksite location of the single proximal detector is used as the approximate location of the arbitrary beacon. This enables the present invention to keep tracking the wearable beacons even if a single stationary detector is available near the workers.

Figure 4:
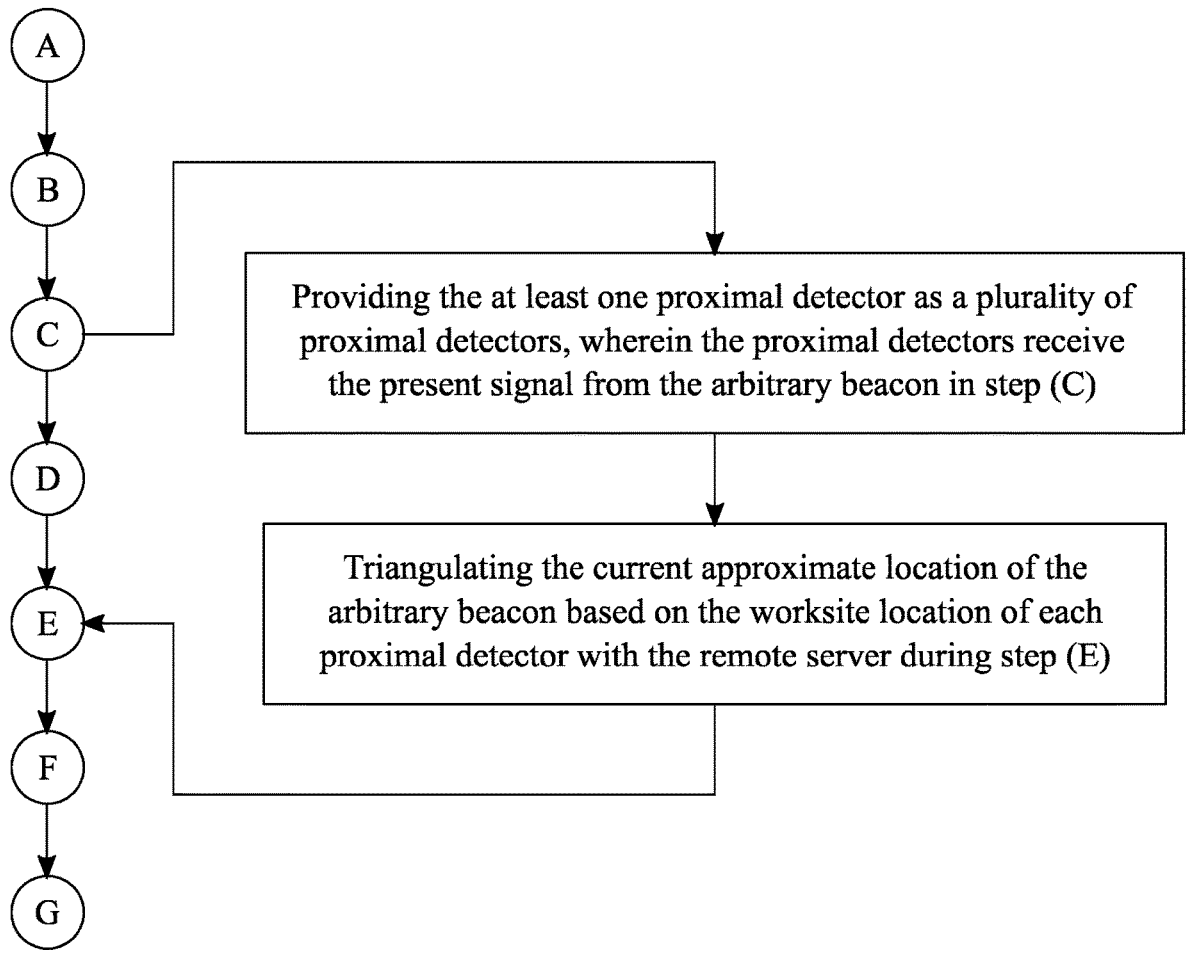
FIG. 4 is a flowchart showing the subprocess of determining the location of the arbitrary beacon with multiple proximal detectors.

Alternatively, if multiple stationary detectors are near the wearable beacons, a more accurate location of the arbitrary beacon can be determined. In the situation where multiple stationary detectors detect the arbitrary beacon, the at least one proximal detector is provided as a plurality of proximal detectors. As can be seen in FIG. 4, the proximal detectors receive the present signal from the arbitrary beacon in Step C to enable the accurate calculation of the arbitrary beacon in the worksite. Further, the subprocess of determining the location of the arbitrary beacon with multiple proximal detectors involves the step of triangulating the current approximate location of the arbitrary beacon based on the worksite location of each proximal detector with the remote server during Step E. In other words, the proximity of the arbitrary beacon to each proximal detector is used to calculate the accurate location of the arbitrary beacon. The location of the wearable beacon can be calculated using a mixture of two methods: Weighted Centroid Localization (WCL) and Fingerprinting using Neural Network (FNN). For example, the signal strength of the arbitrary beacon detected by each proximal detector can be used to determine the accurate location of the arbitrary beacon by pinpointing the location of the arbitrary beacon among the proximal detectors. This enables the accurate tracking of each worker in the worksite to better determine the productivity of the workers by monitoring the workers' locations and activities throughout the workday.

Figure 5:
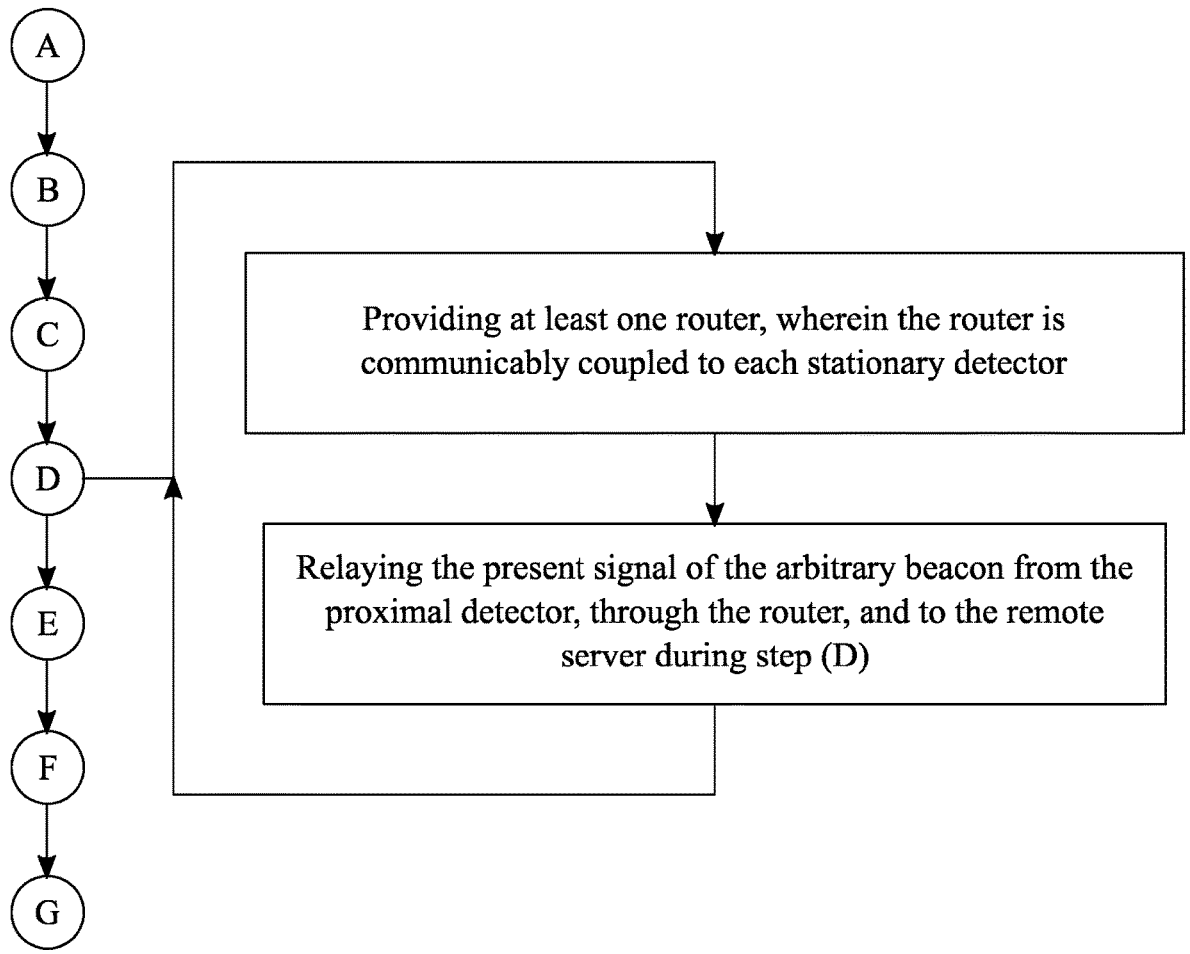
FIG. 5 is a flowchart showing the subprocess of wireless transmitting arbitrary beacon data.

The present invention enables the remote monitoring of the workers even if the worksite is not close to the remote server. As can be seen in FIG. 5, the system of the present invention may further include at least one router. The router is communicably coupled to each stationary detector to enable the wireless transmission of data collected by the stationary detectors. Further, the subprocess of wireless transmitting arbitrary beacon data involves the step of relaying the present signal of the arbitrary beacon from the proximal detector, through the router, and to the remote server during Step D. In other words, the arbitrary beacon data collected by the proximal detector is wireless transmitted to the remote server via the router. Furthermore, multiple routers can be provided to provide greater coverage in a larger worksite. This way, all the wearable beacons at the worksite can be continuously monitored.

Figure 6:
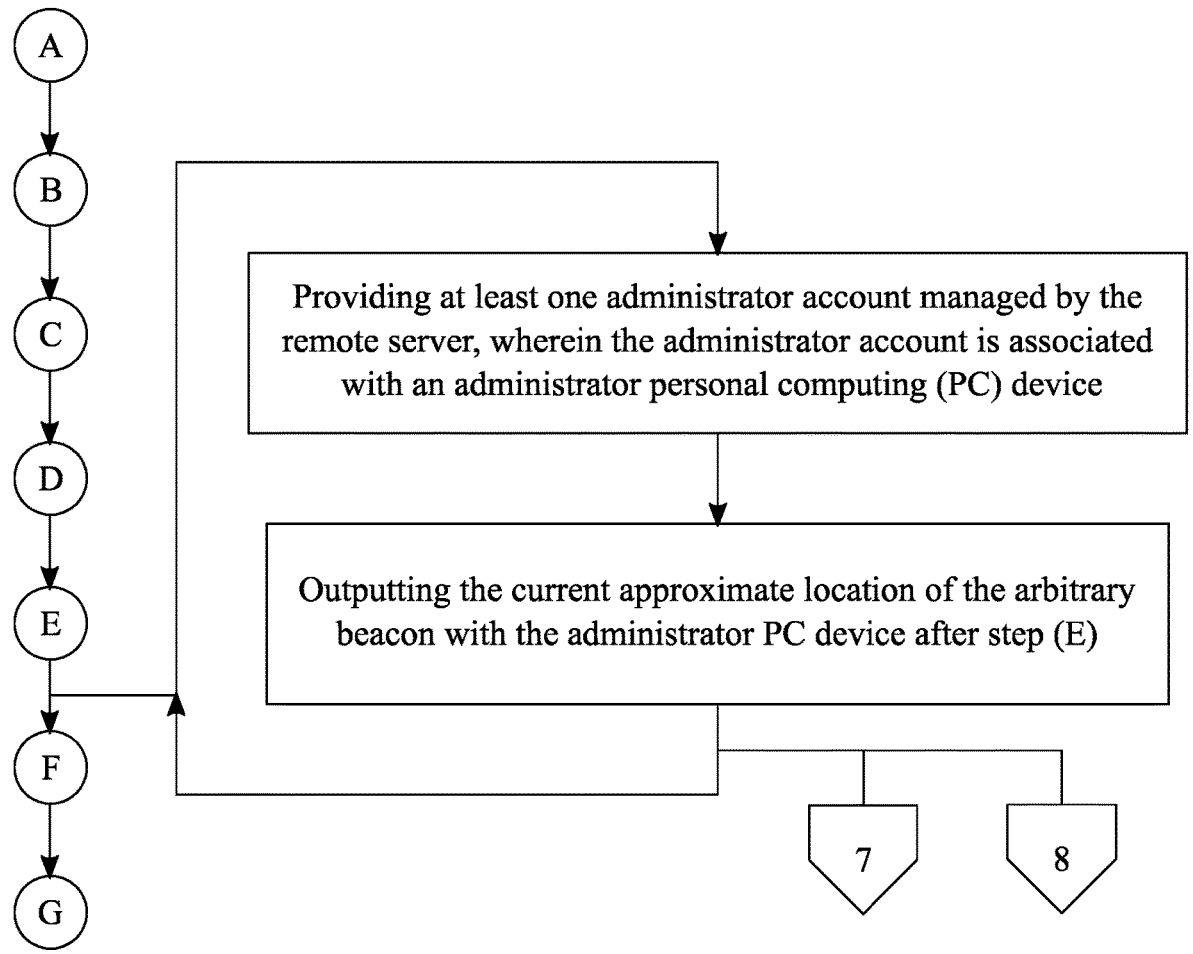
FIG. 6 is a flowchart showing the subprocess of providing the authorized users with the location of a single arbitrary beacon.

As previously discussed, the present invention enables the continuous monitoring of each worker in order to improve the productivity of the workforce as well as to immediately detect any potential work accident. The present invention accomplishes this by providing the information necessary to authorized users, such as project managers, administrators, supervisors, etc. As can be seen in FIGS. 1 and 6, the system of the present invention further includes at least one administrator account managed by the remote server. The administrator account is associated with an administrator personal computing (PC) device that enables the appropriate users to keep track of the workers and to be promptly notified of any emergencies. The subprocess of providing the authorized users with the location of a single arbitrary beacon involves the step of outputting the current approximate location of the arbitrary beacon with the administrator PC device after Step E. In other words, the authorized users are able to retrieve the location of every wearable beacon to determine the location of the workers at the worksite.

Figure 7:
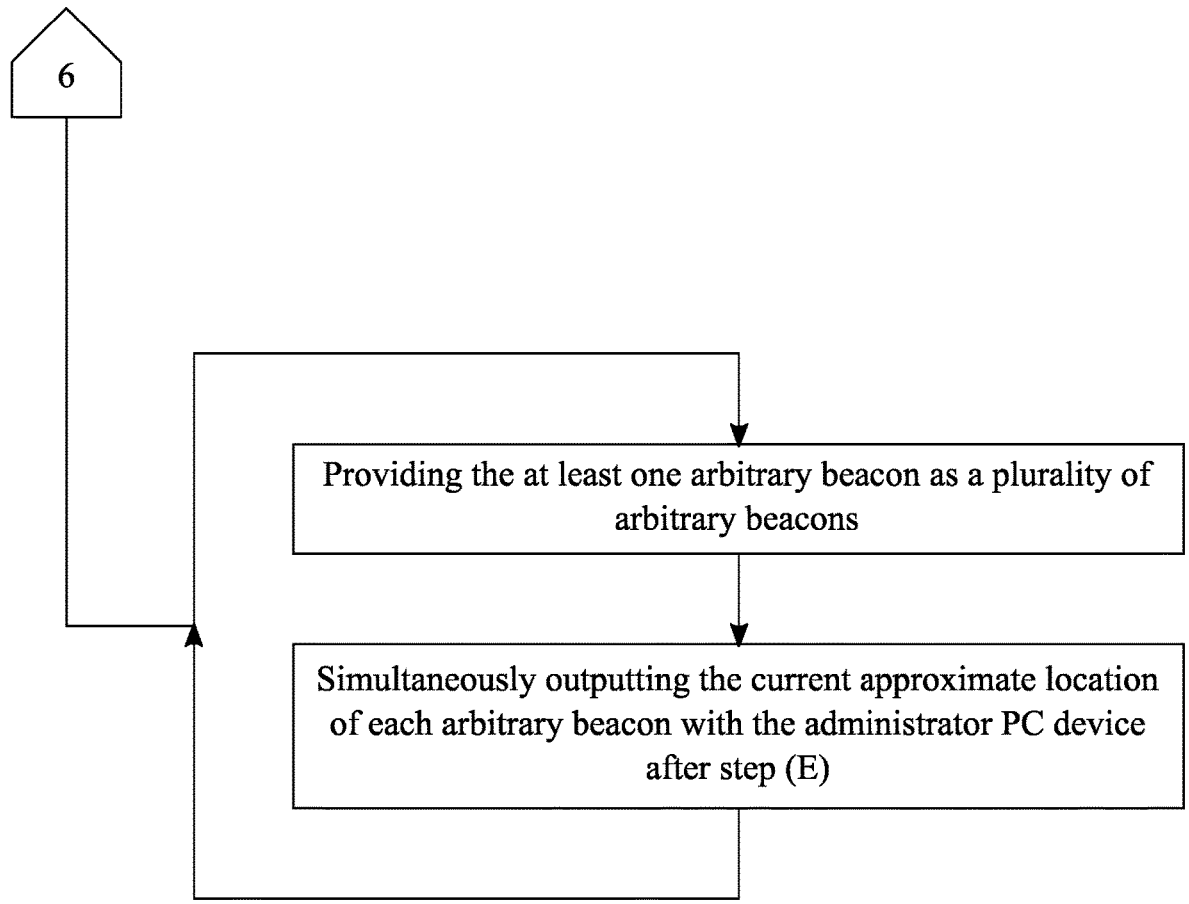
FIG. 7 is a flowchart showing the subprocess of providing the authorized users with the location of multiple arbitrary beacons.

As can be seen in FIG. 7, the authorized users can also monitor several arbitrary beacons by providing the at least one arbitrary beacon as a plurality of arbitrary beacons. The subprocess of providing the authorized users with the location of multiple arbitrary beacons includes the step of simultaneously outputting the current approximate location of each arbitrary beacon with the administrator PC device after Step E. In other words, the authorized users can simultaneously track multiple workers.

Figure 8:
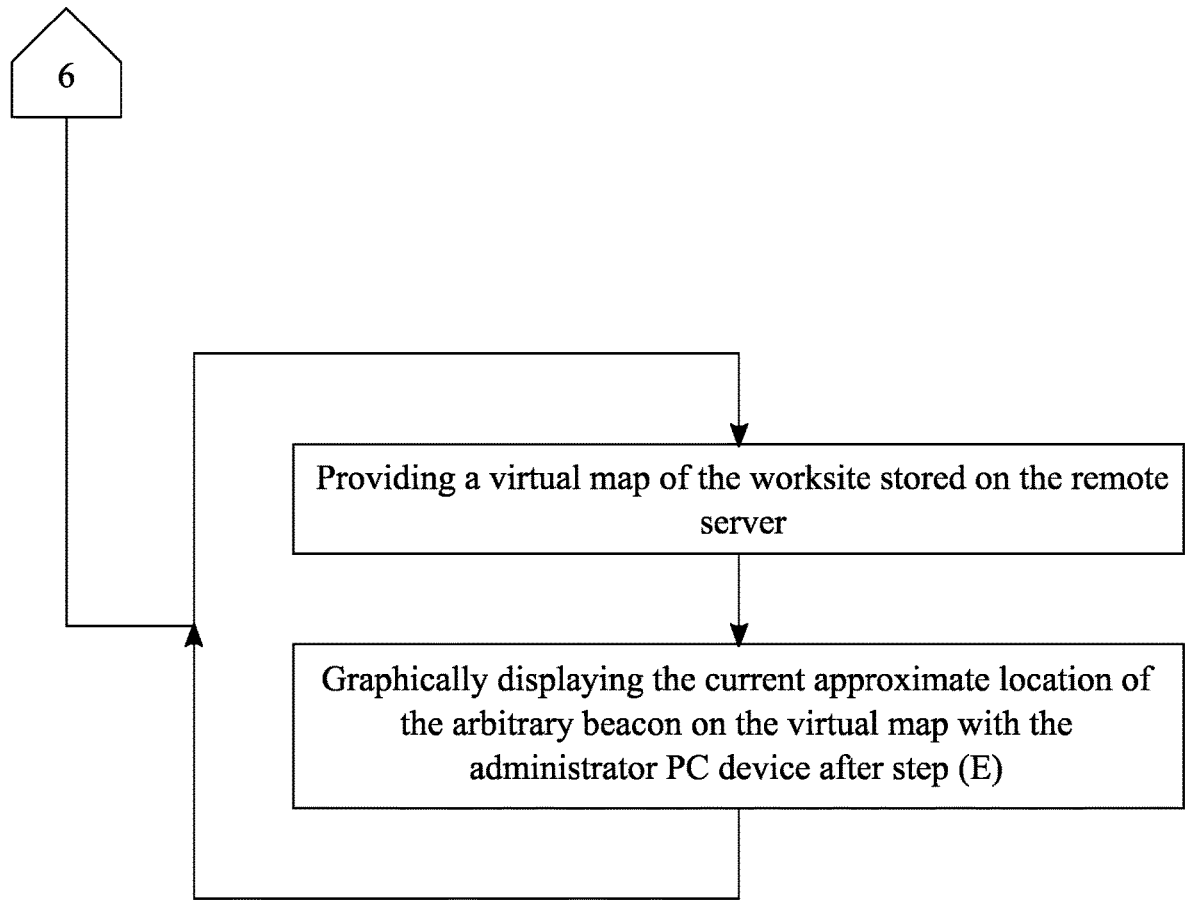
FIG. 8 is a flowchart showing the subprocess of visualizing of the workers using the virtual map.

Furthermore, the present invention can provide a dashboard where the authorized users can visualize the location of each worker at the worksite. As can be seen in FIG. 8, the system of the present invention further provides a virtual map of the worksite stored on the remote server. The virtual map facilitates the location of the workers, specially by users who are not familiar with the worksite. The subprocess of visualizing of the workers using the virtual map includes the step of graphically displaying the current approximate location of the arbitrary beacon on the virtual map with the administrator PC device after Step E. This way, the authorized users can easily track the location of the workers at the worksite. This is very important during emergencies to provide the necessary aid to the workers that may have been involved in an accident.

Figure 9:
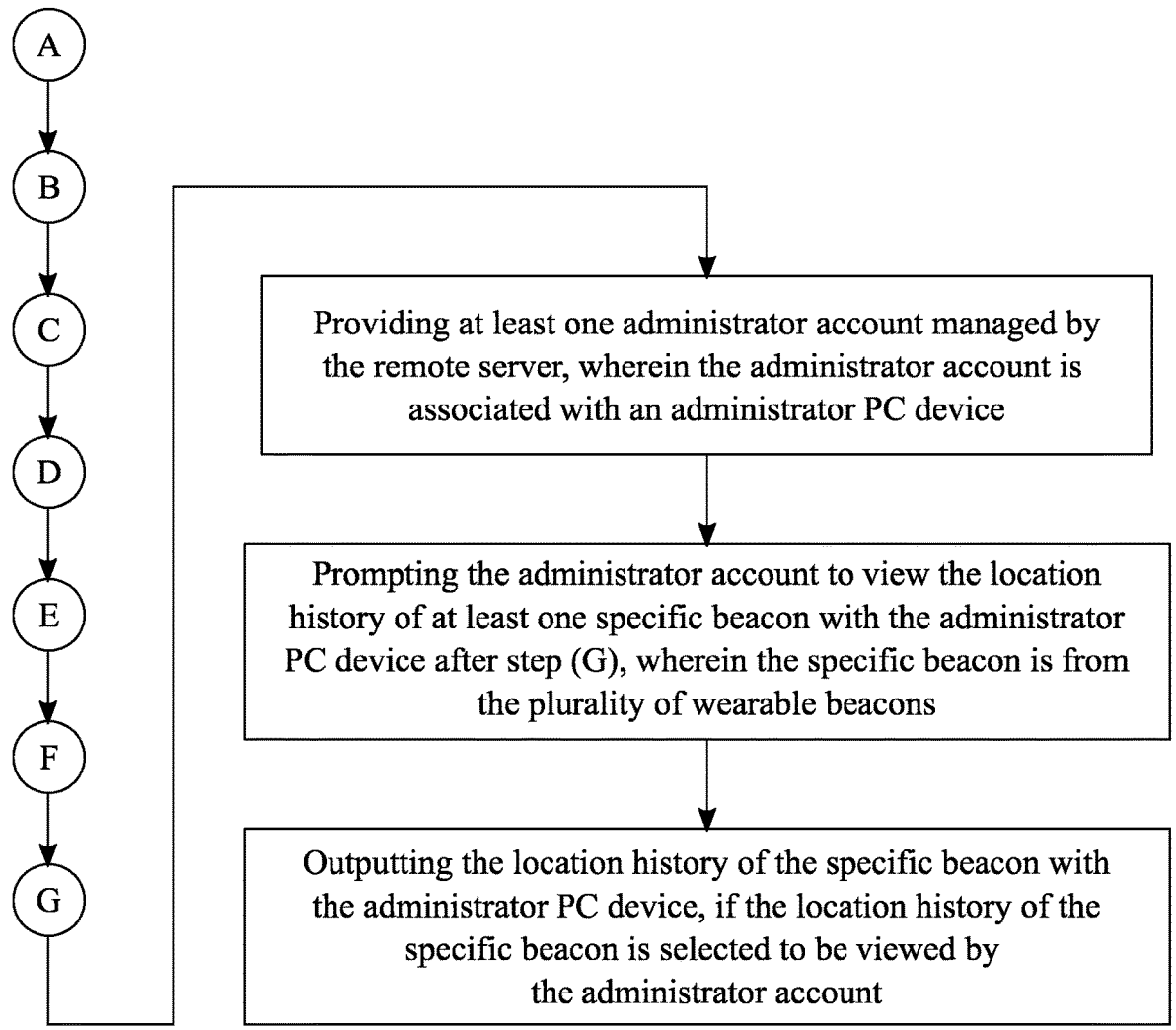
FIG. 9 is a flowchart showing the subprocess of displaying the location history of each worker.

For performance evaluation purposes, the present invention enables authorized users to look at the individual worker's history to determine the overall performance of the user in order to improve productivity. As can be seen in FIG. 9, the subprocess of displaying the location history of each worker includes the step of prompting the administrator account to view the location history of at least one specific beacon with the administrator PC device after Step G. The specific beacon is from the plurality of wearable beacons, enabling the administrator to selectively look at any of the worker's location history as desired. Then, the location history of the specific beacon is outputted with the administrator PC device, if the location history of the specific beacon is selected to be viewed by the administrator account. In other words, the administrator is able to retrieve the location history of every worker on the workplace to analyze the performance of the worker.

Figure 10:
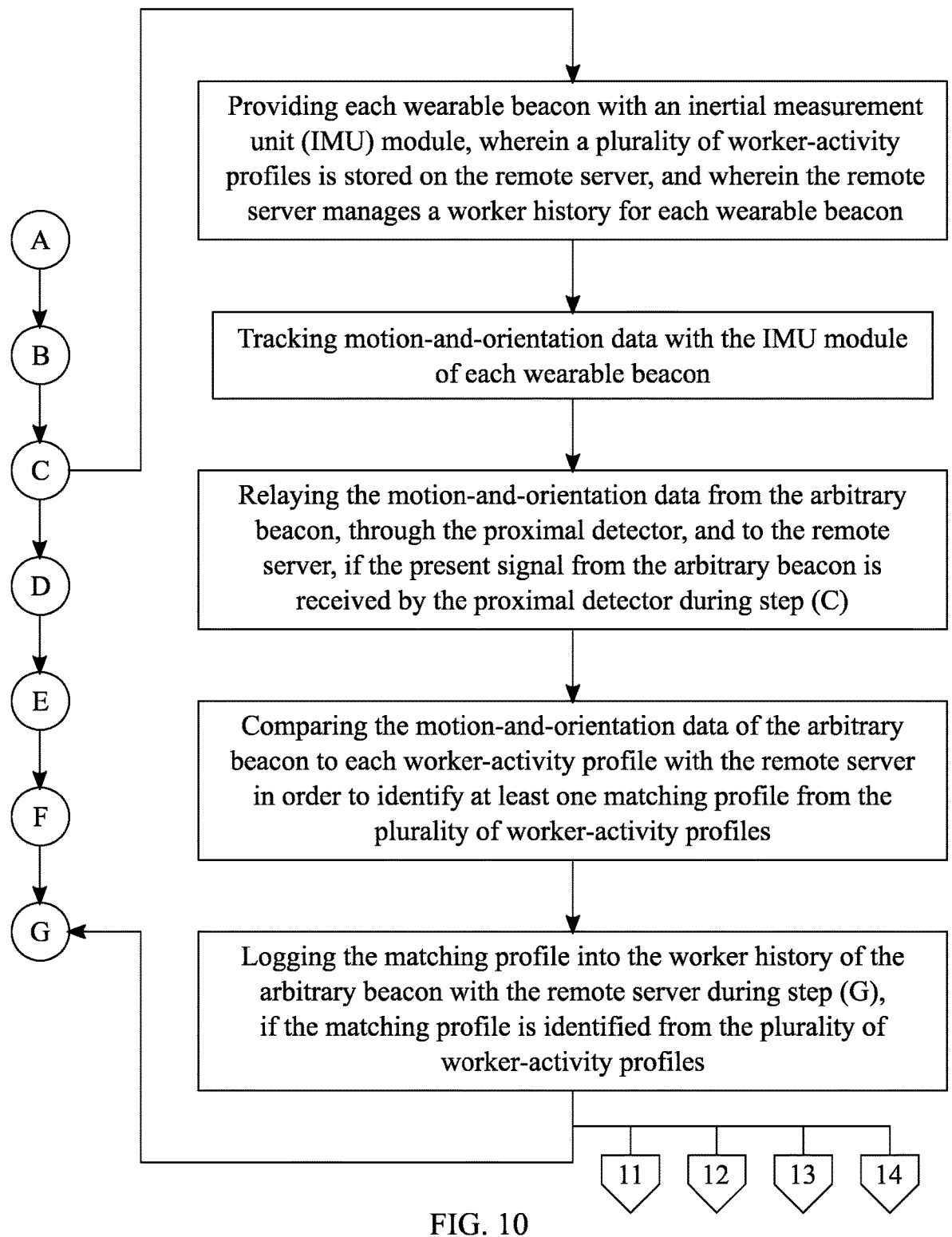
FIG. 10 is a flowchart showing the subprocess of monitoring the worker condition in the worksite.

In addition to tracking the location of every worker, the present invention enables the tracking of the status of each worker to quickly detect any potential accident that might affect any of the workers as well as to determine the work status of each worker. As can be seen in FIG. 10, each wearable beacon is provided with an inertial measurement unit (IMU) module. The IMU module enables the tracking of the motion and orientation of the wearable beacon so that any accidents that the worker may suffer is promptly detected. The IMU module also enables the tracking of the worker's activity throughout the workday. Further, the remote server stores a plurality of worker-activity profiles. The worker-activity profiles include worker data such as when the worker is standing still, going to the bathroom, taking a break, or doing other activities related to work. In addition, each wearable beacon can include a unique identifier that can be used to determine the ownership of the wearable beacon. In addition, the remote server also manages a worker history for each wearable beacon that is different from the location history for each worker. The worker history can include worker data that corresponds to the condition of the worker overtime. The subprocess of monitoring the worker condition in the worksite includes the step of tracking motion-and-orientation data with the IMU module of each wearable beacon. Then, the motion-and-orientation data is relayed from the arbitrary beacon, through the proximal detector, and to the remote server, if the present signal from the arbitrary beacon is received by the proximal detector during Step C. In other words, the motion-and-orientation data is relayed once the wearable beacon is detected by a stationary detector. This prevents the motion-and-orientation data from being relayed to unauthorized devices. Then, the remote server compares the motion-and-orientation data of the arbitrary beacon to each worker-activity profile in order to identify at least one matching profile from the plurality of worker-activity profiles. This step enables the detection of anomalies from the usual worker's conditions in order to accurately detect potential accidents in the worksite or drops in productivity. Then, the matching profile is logged into the worker history of the arbitrary beacon with the remote server during Step G, if the matching profile is identified from the plurality of worker-activity profiles. Each matching profile can correspond to different occurrences, such as the worker being idle, the worker being in accident, etc.

Figure 11:
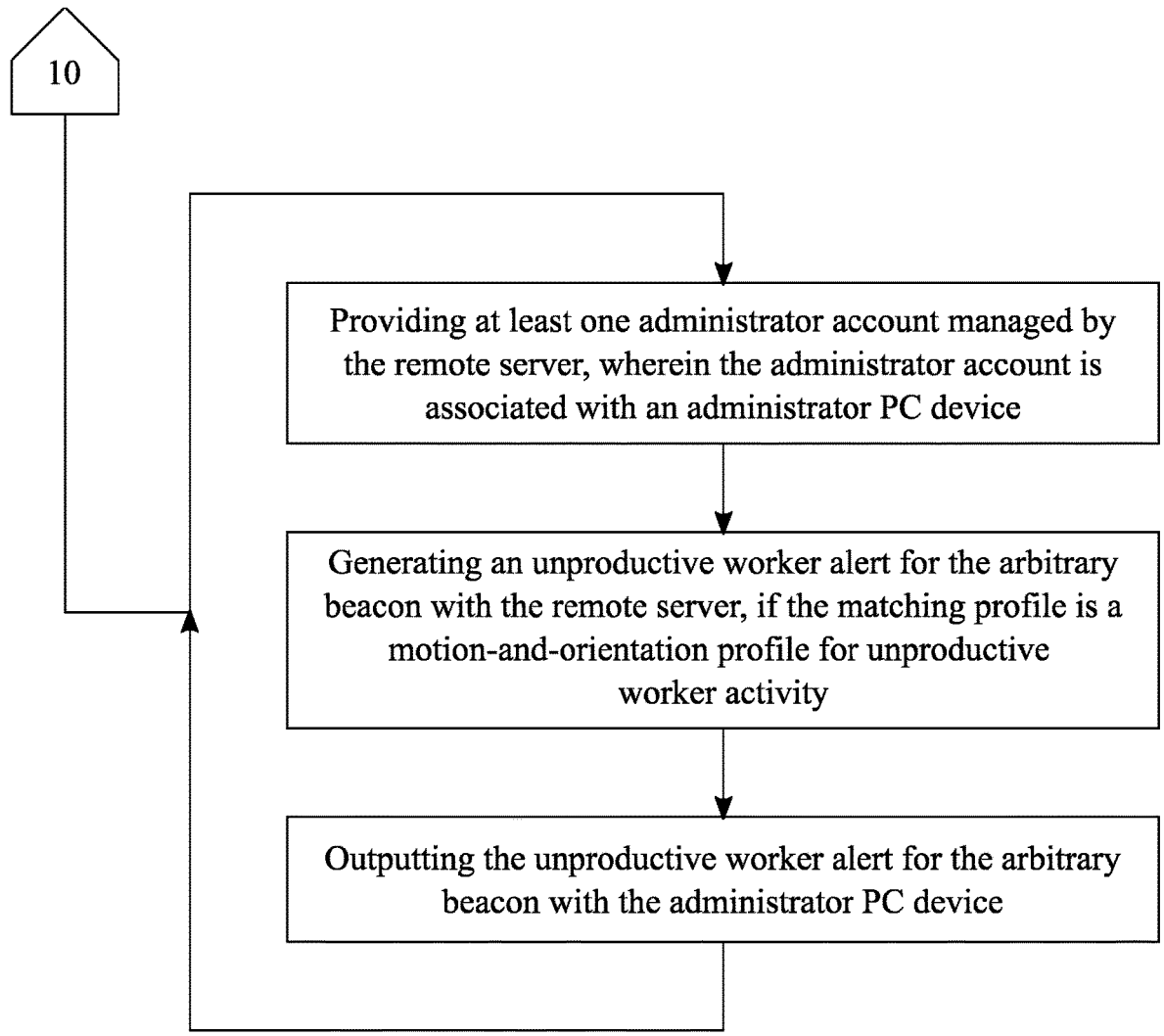
FIG. 11 is a flowchart showing the subprocess of generating alerts for unproductive workers.

In the situation where the worker is being unproductive, the present invention can enable notifications to the appropriate users, such as management, to alert the users whenever a worker is being unproductive. As can be seen in FIG. 11, the subprocess of generating alerts for unproductive workers includes the step of generating an unproductive worker alert for the arbitrary beacon with the remote server, if the matching profile is a motion-and-orientation profile for unproductive worker activity. In other words, the motion-and-orientation data was similar to the data of a motion-and-orientation profile for unproductive worker activity. This enables the accurate assessment of when a worker is being unproductive. Then, the unproductive worker alert for the arbitrary beacon is outputted with the administrator PC device to alert the appropriate users to take the necessary actions.

Figure 12:
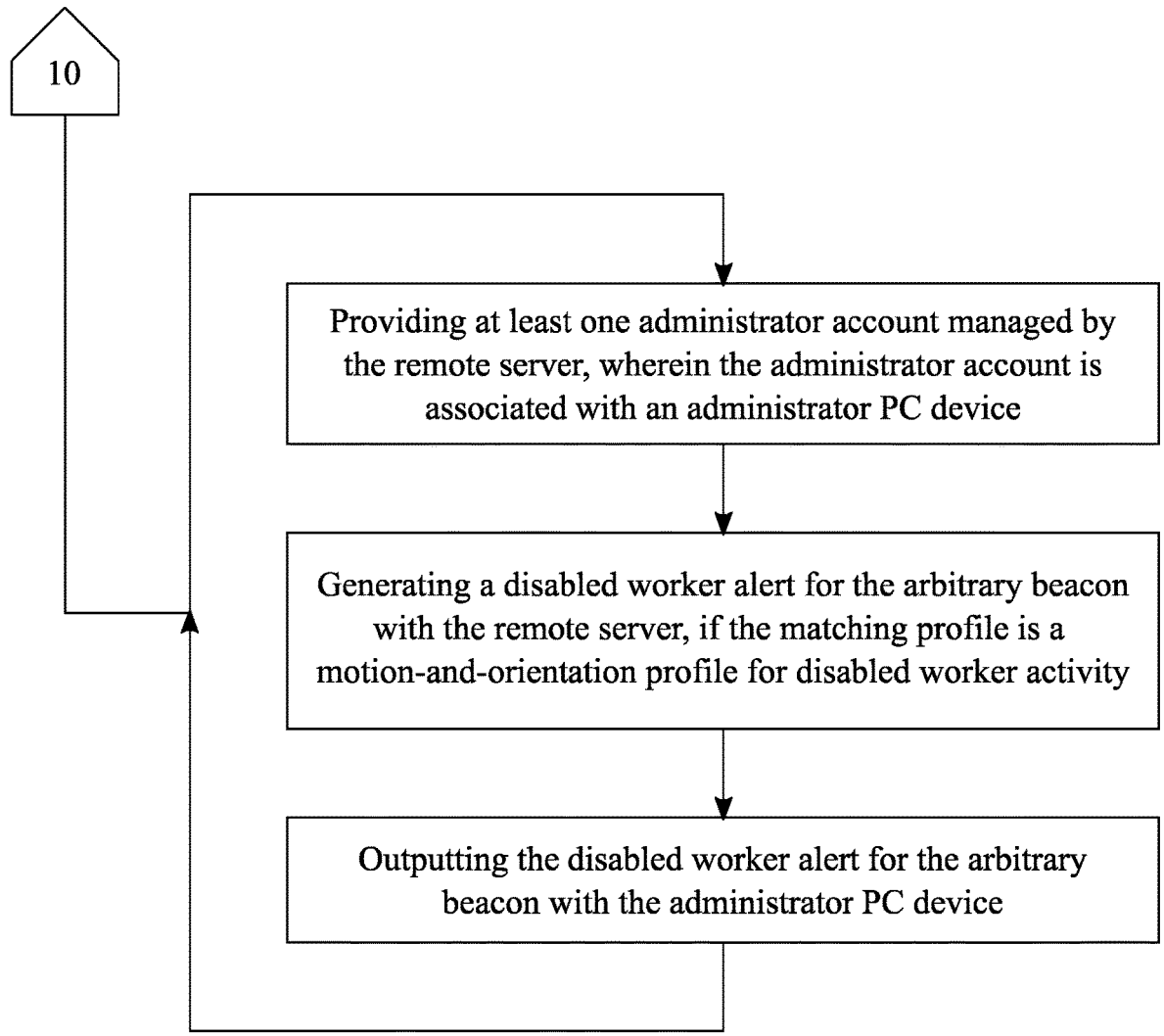
FIG. 12 is a flowchart showing the subprocess of generating alerts for disabled workers.

Similar to when a worker is determined to be unproductive, the present invention can also generate alerts for potential accidents the workers may be involved in. As can be seen in FIG. 12, the subprocess of generating alerts for disabled workers includes the step of generating a disabled worker alert for the arbitrary beacon with the remote server, if the matching profile is a motion-and-orientation profile for disabled worker activity. The disabled worker alert preferably corresponds to the situations where the worker has been in an accident and the worker is disabled. Then, the disabled alert for the arbitrary beacon is outputted with the administrator PC device so that the appropriate users are quickly notified of the disabled worker. This gives the appropriate users a better chance to quickly take the necessary actions to aid the disabled worker.

Figure 13:
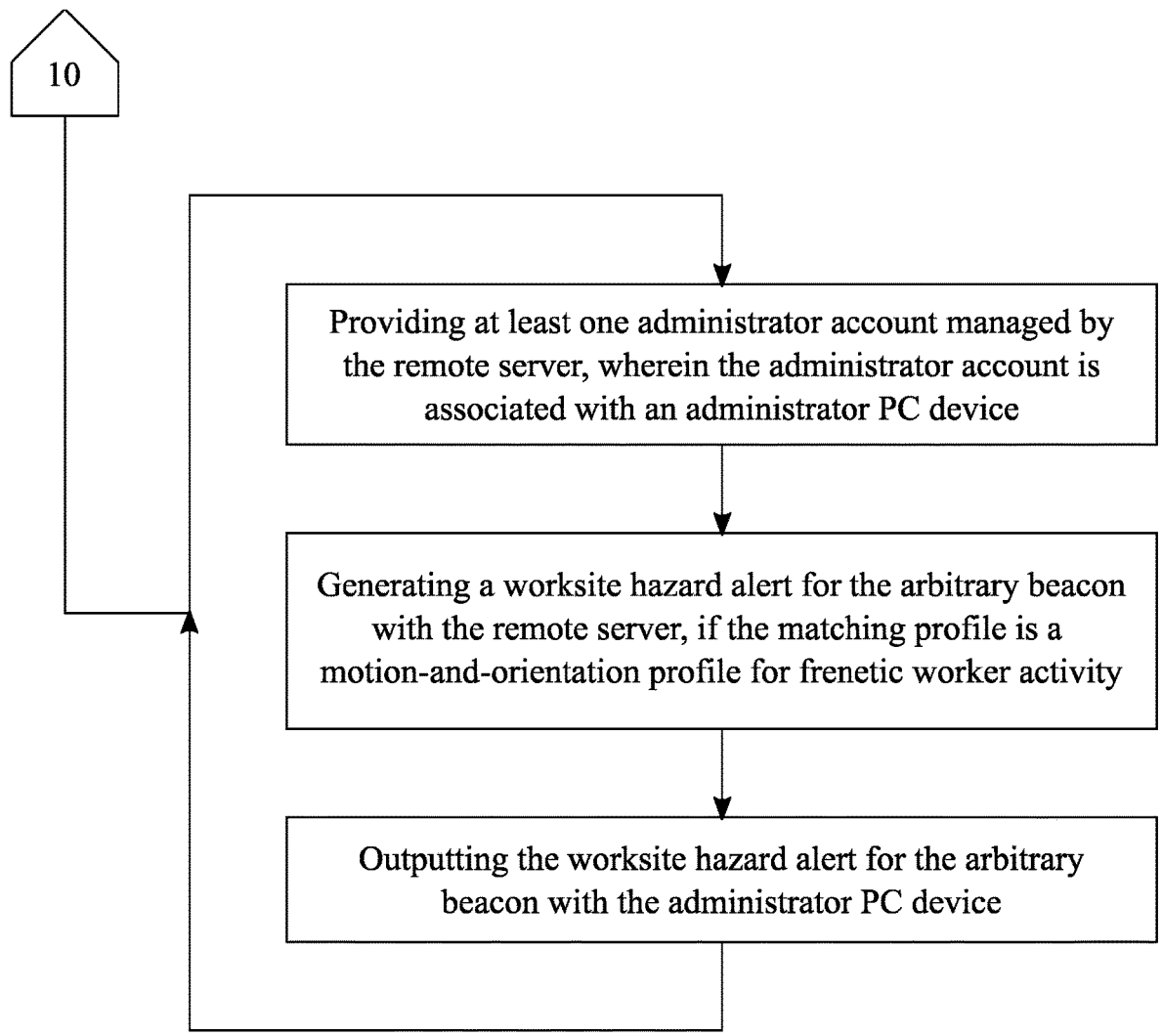
FIG. 13 is a flowchart showing the subprocess of generating alerts for worksite hazards.

Like the disabled worker alert, the present invention enables the quick detection of worksite hazards as the hazards occur to generate an alert that notifies the appropriate users of the worksite hazard. For example, the present invention can detect an environmental hazard like an earthquake or a work hazard like a chemical spill. As can be seen in FIG. 13, the subprocess of generating alerts for worksite hazards includes the step of generating a worksite hazard alert for the arbitrary beacon with the remote server, if the matching profile is a motion-and-orientation profile for frenetic worker activity. The frenetic worker activity corresponds to situations where the worker is not acting normally due to hazards that affect the worker's conditions. Then, the worksite hazard alert for the arbitrary beacon is outputted with the administrator PC device to quickly notify the appropriate users of the hazard so that the users can take the appropriate actions, such as evacuating the worksite.

Figure 14:
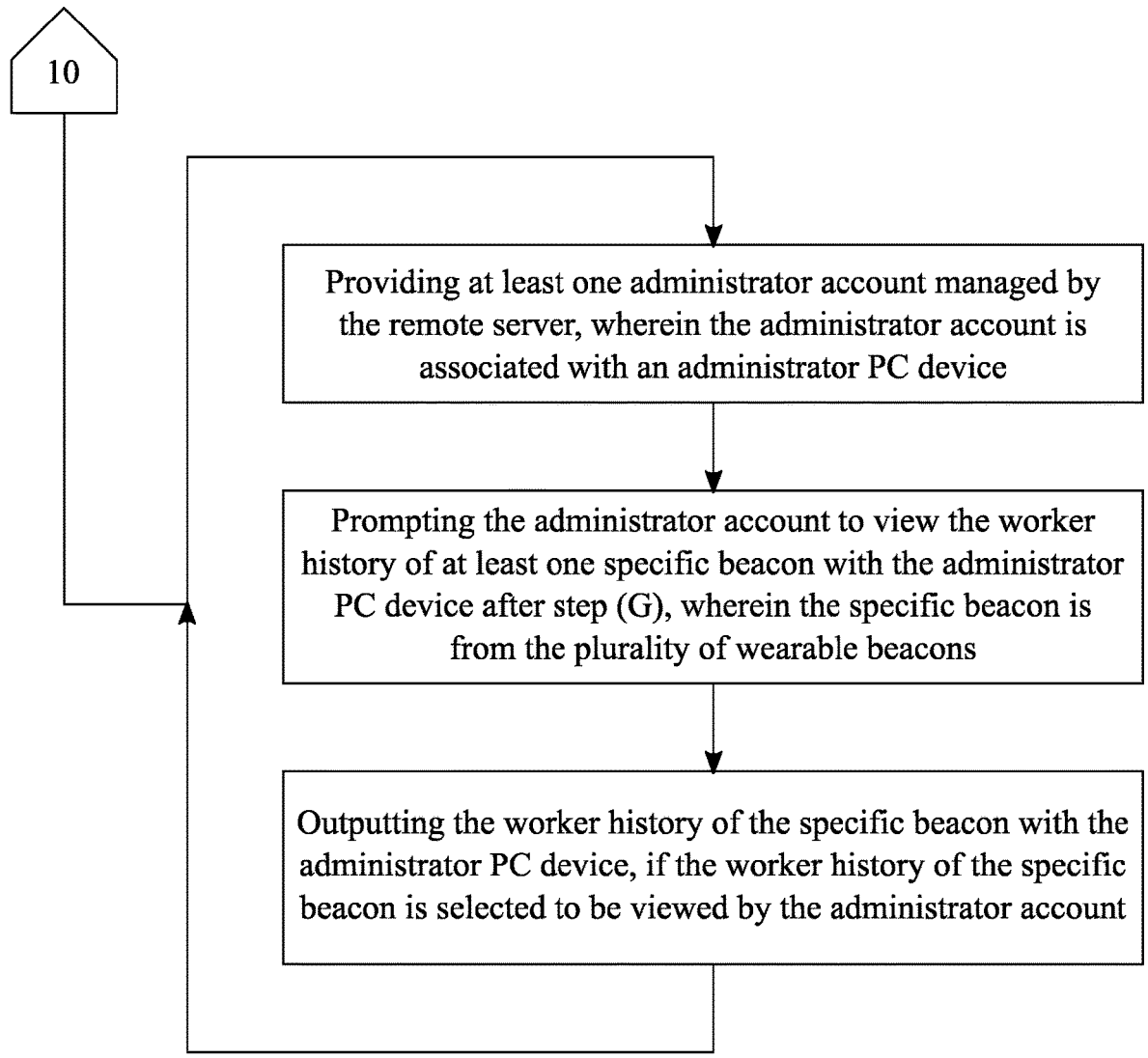
FIG. 14 is a flowchart showing the subprocess of retrieving the worker history.

Furthermore, similar to the location history, the worker history can be viewed by the appropriate users for worker evaluation. As can be seen in FIG. 14, the subprocess of retrieving the worker history includes the step of prompting the administrator account to view the worker history of at least one specific beacon with the administrator PC device after Step G. The specific beacon is from the plurality of wearable beacons, so that the administrator can selectively retrieve the worker history from any of the workers. Then, the worker history of the specific beacon with the administrator PC device, if the worker history of the specific beacon is selected to be viewed by the administrator account. This way, the administrators can analyze the worker history to determine the propensity of the worker to be involved in an accident.

Figure 15:
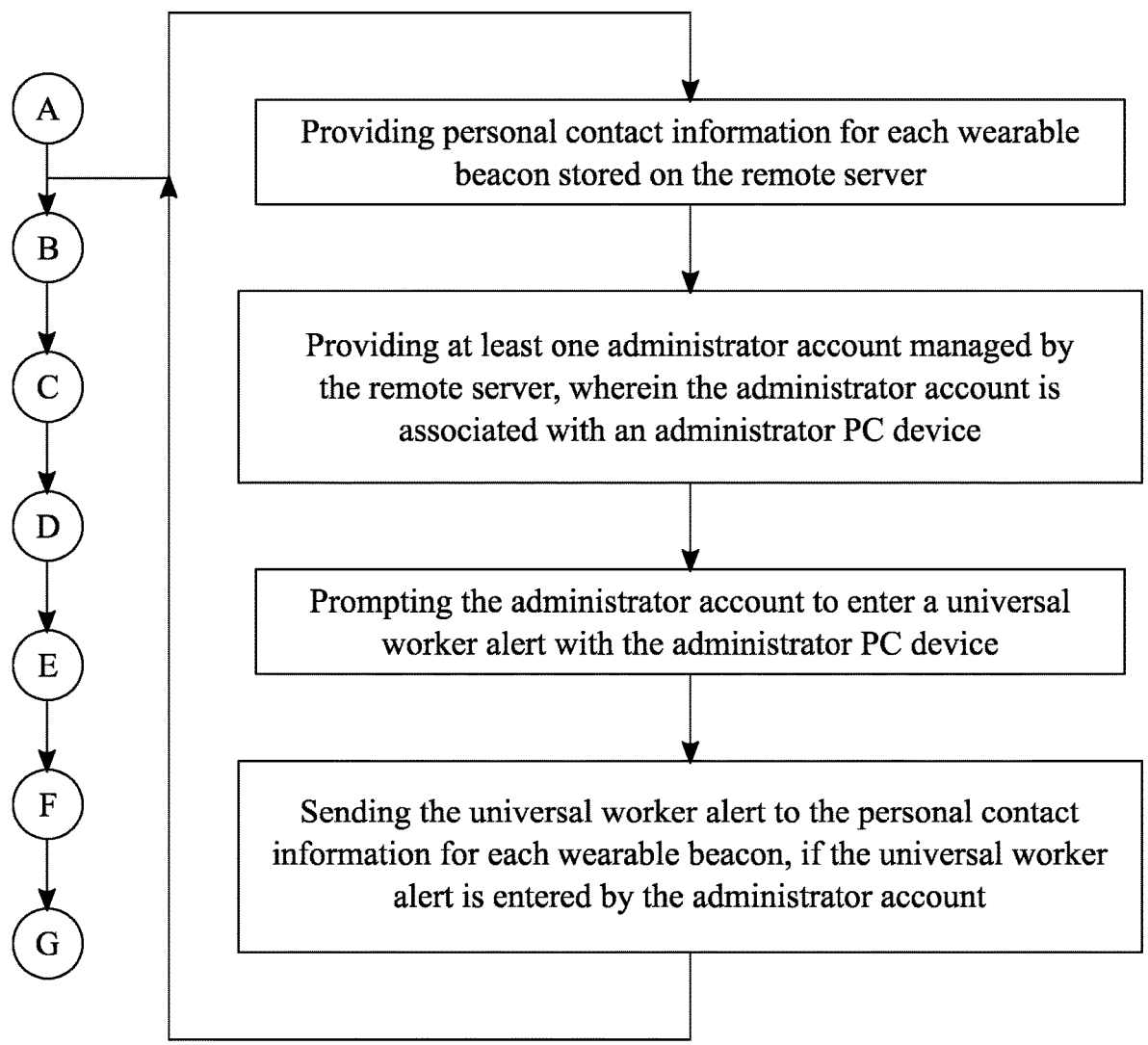
FIG. 15 is a flowchart showing the subprocess of contacting the worker using third-party communication services.

The present invention also enables the communication of alerts and other notifications to third-party communication services including, but not limited to, texts, phone calls, emails, etc. As can be seen in FIG. 15, the system of the present invention further includes personal contact information for each wearable beacon stored on the remote server. The personal contact information can include, but is not limited to, the personal phone number or personal email address with which the worker can be contacted. The subprocess of contacting the worker using third-party communication services includes the step of prompting the administrator account to enter a universal worker alert with the administrator PC device. The universal worker alert can include different notifications that need to be transmitted to the workers, such as potential hazards that can affect all workers at the worksite. Then, the universal worker alert is sent to the personal contact information for each wearable beacon, if the universal worker alert is entered by the administrator account. This way, if a worker is not able to be reached using the present invention, the worker can still be notified using third-party communication services in case of emergencies.

Figure 16:
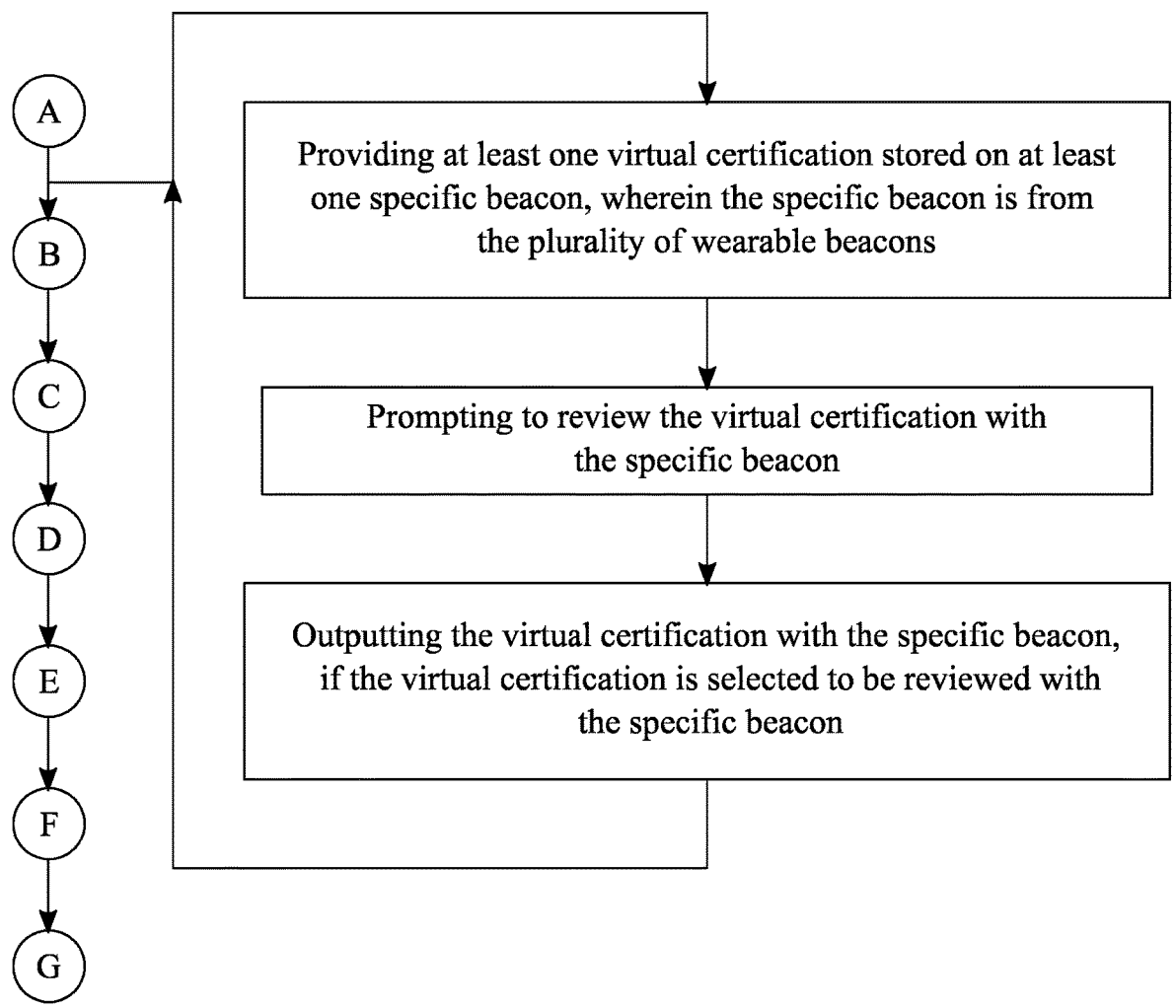
FIG. 16 is a flowchart showing the subprocess of presenting a virtual certification of the worker.

In addition to tracking the location and performance of the individual worker, the present invention also enables each worker to carry any necessary personal information that may be needed at the worksite, such as personal certifications. The present invention is configured to comply with any organizational, local, state, federal, or international laws or regulations. The present invention can meet compliance for certificates, security, and necessary certificates for each worker's certificates. For example, Occupational Safety and Health Administration (OSHA) certification can be required for every worker on-site. Thus, every worker can be required to upload the respective OSHA certification. Enabling the ease of access to certifications provides an automated solution for tracking the accreditation for the individual worker. As can be seen in FIG. 16, the system of the present invention provides at least one virtual certification stored on at least one specific beacon. The at least one virtual certification can include professional certifications or licenses that the worker may be required to show while working at the worksite. Accordingly, the specific beacon is from the plurality of wearable beacons so that any worker can readily present the virtual certification. The subprocess of presenting the virtual certification of the worker includes the step of prompting to review the virtual certification with the specific beacon. The user requesting the certification can utilize a secondary computing device, such as a wireless reader, which can prompt the specific beacon to output the virtual certification. Alternatively, the specific beacon can be equipped with a display or similar feature that can visually display the virtual certificate. Then, the virtual certification is outputted with the specific beacon, if the virtual certification is selected to be reviewed with the specific beacon. The individual worker can store the virtual certification manually using a user PC that is connected to the wearable beacon. Alternatively, administrators can input the virtual certification to be stored at the corresponding wearable beacon.

Figure 17:
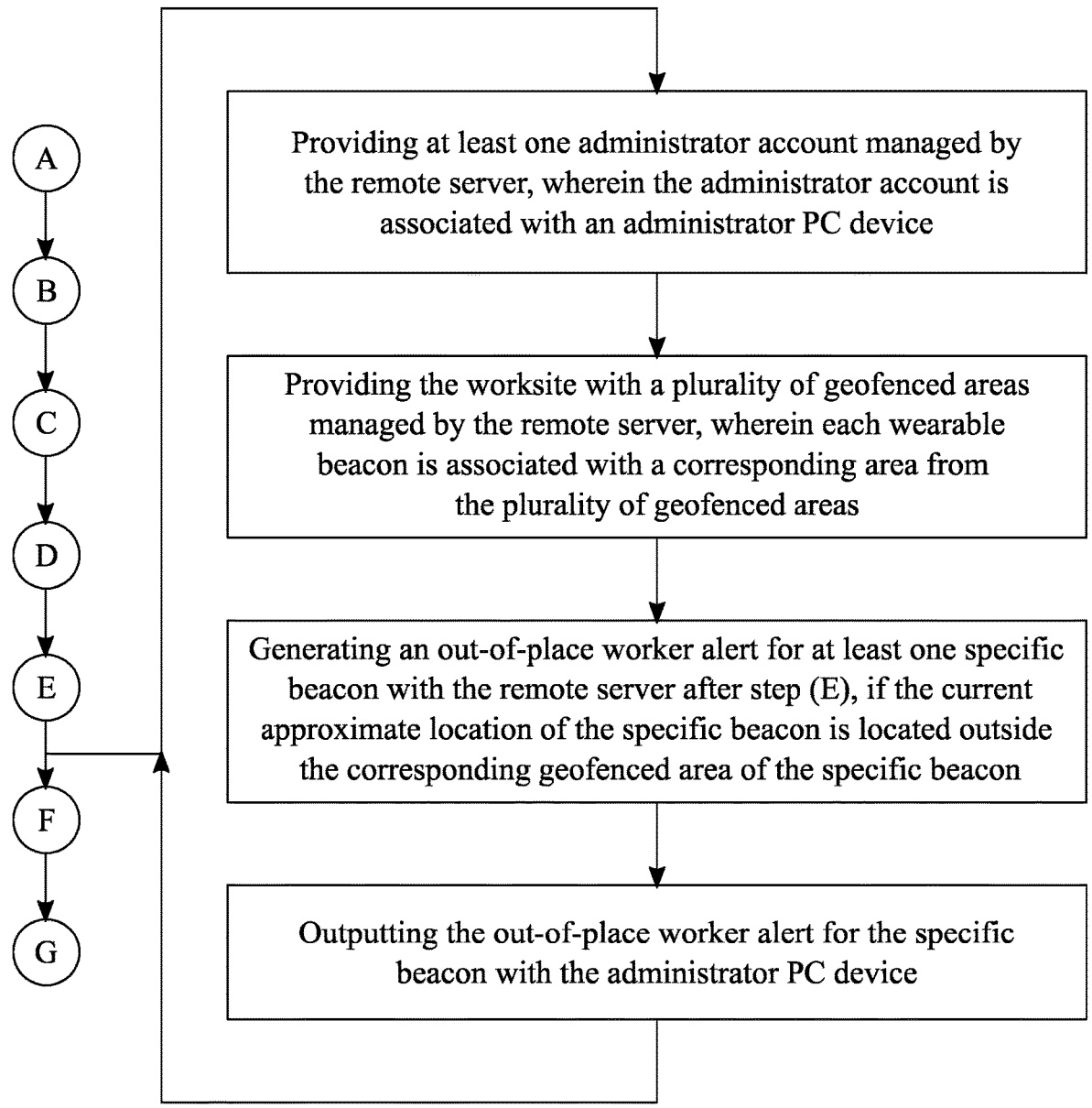
FIG. 17 is a flowchart showing the subprocess of managing the worker location using geofencing.

To further improve productivity, the present invention can enable location management of each worker so that the workers are at the correct working location at the worksite. This can be useful when workers are required to prioritize tasks but may be moved to different tasks due to miscommunication. As can be seen in FIG. 17, the system of the present invention further includes a plurality of geofenced areas for the worksite that is managed by the remote server. The geofenced areas can correspond to worksite locations associated with specific tasks. In addition, each wearable beacon is associated with a corresponding area from the plurality of geofenced areas. This enables the correct location of the worker at the worksite to ensure that the worker is performing the correct task. The subprocess of managing the worker location using geofencing includes the step of generating an out-of-place worker alert for at least one specific beacon with the remote server after Step E, if the current approximate location of the specific beacon is located outside the corresponding geofenced area of the specific beacon. In order words, if the worker is currently at the wrong worksite location, then the user is determined to be out-of-place. Then, the out-of-place worker alert for the specific beacon is outputted with the administrator PC device. This enables administrators to quickly catch out-of-place workers and ensure that the workers go to the correct worksite location to perform the correct tasks.

Figure 18:
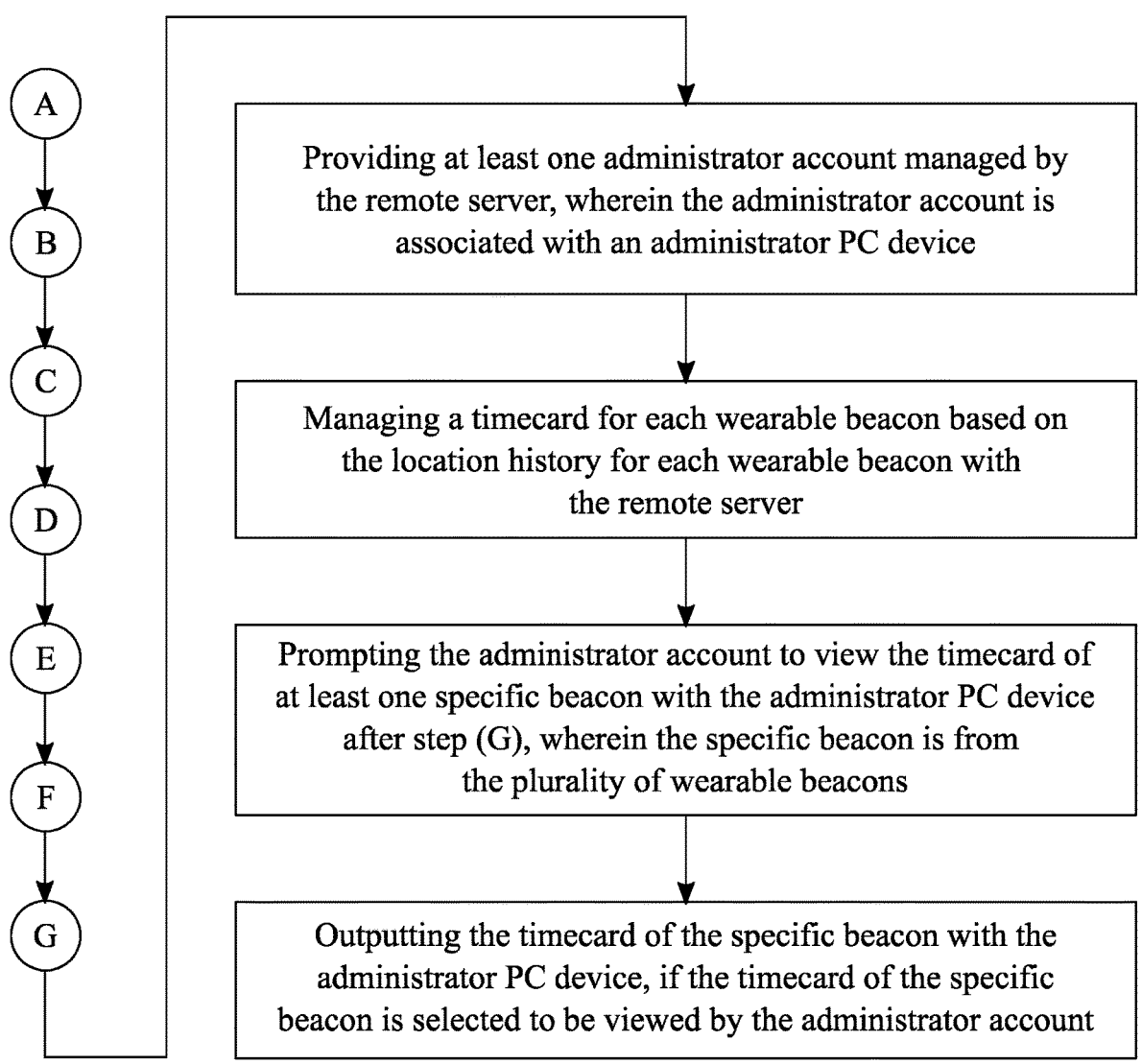
FIG. 18 is a flowchart showing the subprocess of managing a timecard for a worker.

The present invention also enables effective cost and time solutions for the individual projects. The present invention enables accurate resource planning, budgeting, and payroll for each project. The present invention enables management to have greater control over the project's budget by enabling the automatic calculation of each worker's work hours. This ensures that the correct work times for every worker are recorded to pay the workers the correct salary. As can be seen in FIG. 18, the subprocess of managing a timecard for a worker includes the step of managing a timecard for each wearable beacon based on the location history for each wearable beacon with the remote server. For example, the clock-in time for a worker can be calculated by determining the first time the wearable beacon was detected by a stationary detector at the worksite. In addition, the clock-out time for the worker can be calculated by determining the last time the wearable beacon was detected by a stationary detector at the worksite. Then, the worktime for each workday can be calculated by determining the difference between the clock-out time and the clock-in time. Furthermore, the administrator account can be prompted to view the timecard of at least one specific beacon with the administrator PC device after Step G. The specific beacon is from the plurality of wearable beacons so that the appropriate users can look at the timecards for every worker. Then, the timecard of the specific beacon is outputted with the administrator PC device, if the timecard of the specific beacon is selected to be viewed by the administrator account.

Figure 19:
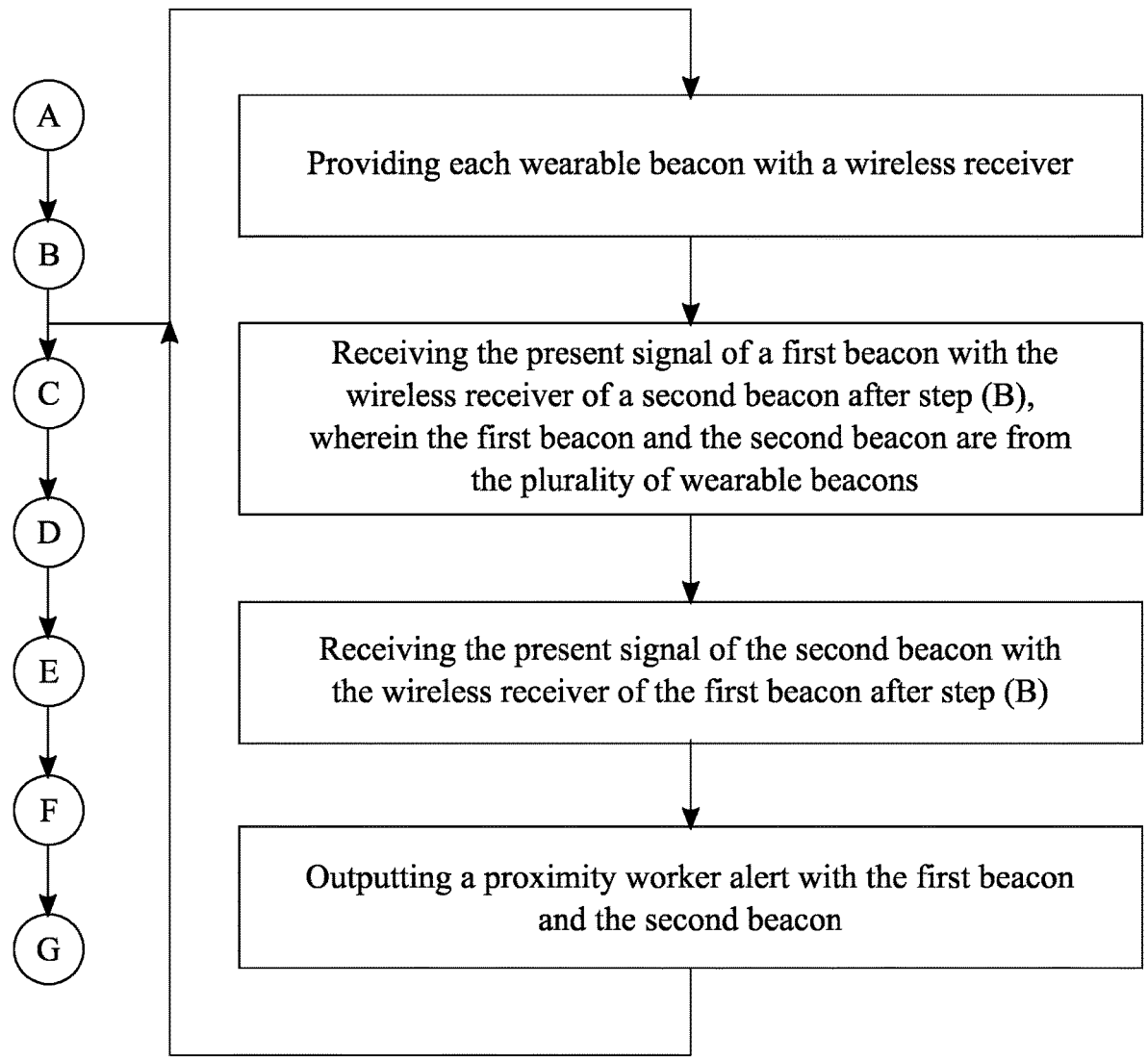
FIG. 19 is a flowchart showing the subprocess of alerting the worker of close proximity to other workers.

Furthermore, the present invention provides safety measures to help the workers to stay safe while working at the worksite. For example, the wearable beacons can alert the worker of other workers nearby as well as other objects that could pose a hazard to the worker. As can be seen in FIG. 19, the system of the present invention provides each wearable beacon with a wireless receiver. The wireless receiver enables the wearable beacon to receive wireless signals from other wearable beacons and/or the stationary detectors. For example, the wireless receiver can utilize Bluetooth Low Energy (BLE) and Lora protocols to transmit data to the stationary detectors as well as to other wearable beacons. Further, the BLE and Lora protocols are used to capture the information from the construction project, manufacturing warehouse, transportation system, or supply chain system. The subprocess of alerting the worker of close proximity to other workers includes the step of receiving the present signal of a first beacon with the wireless receiver of a second beacon after Step B. The first beacon and the second beacon are from the plurality of wearable beacons, which enables any wearable beacon that are too close to each other to be alerted of the proximity to each other. The subprocess of alerting workers of close proximity to other workers further includes the step of receiving the present signal of the second beacon with the wireless receiver of the first beacon after Step B. In other words, when a worker gets too close to another worker, the corresponding wearable beacons detect the present signal of each other. Then, a proximity worker alert with the first beacon and the second beacon is outputted so that each worker is notified of the proximity to each other. In addition to the enhanced productivity and safety of the individual workers, the present invention further enables the establishment of the most optimal number of workers required for any activity. The data of each worker on-site is collected based on the activities, which is further grouped into what activity was. An algorithm and multiple functions provide optimized recommendations through predictive analytics for the number of workers needed as well as the time resources for the workers to complete the desired task.

Although the invention has been explained in relation to its preferred embodiment, it is to be understood that many other possible modifications and variations can be made without departing from the spirit and scope of the invention.

What is claimed is:

1. A method for monitoring the location of workers in a worksite to enhance safety and productivity, the method comprising the steps of:
   (A) providing a plurality of wearable beacons, a plurality of stationary detectors, and at least one remote server, wherein the stationary detectors are distributed throughout a worksite, and wherein the remote server stores a worksite location for each stationary detector, and wherein the remote server manages a location history for each wearable beacon, and wherein the remote server manages at least one administrator account, and wherein the administrator account is associated with an administrator personal computing (PC) device;
   (B) broadcasting a beacon signal with each wearable beacon;
   (C) receiving the beacon signal from at least one arbitrary beacon with at least one proximal detector, wherein the arbitrary beacon is any device from the plurality of wearable beacons, and wherein the proximal detector is from the plurality of stationary detectors;
   (D) relaying the beacon signal of the arbitrary beacon from the proximal detector to the remote server;
   (E) assessing a current approximate location of the arbitrary beacon from the worksite location of the proximal detector with the remote server;
   (F) logging the current approximate location of the arbitrary beacon into the location history of the arbitrary beacon with the remote server;
   (G) executing a plurality of iterations for steps (B) through (F); and
   outputting the current approximate location of the arbitrary beacon with the administrator PC device after step (E).

2. The method as claimed in claim 1 comprising the steps of:
   providing the at least one proximal detector as a single proximal detector, wherein the single proximal detector receives the beacon signal from the arbitrary beacon in step (C); and
   designating the worksite location of the single proximal detector as the current approximate location of the arbitrary beacon with the remote server during step (E).

3. The method as claimed in claim 1 comprising the steps of:
   providing the at least one proximal detector as a plurality of proximal detectors, wherein the proximal detectors receive the beacon signal from the arbitrary beacon in step (C); and
   triangulating the current approximate location of the arbitrary beacon based on the worksite location of each proximal detector with the remote server during step (E).

4. The method as claimed in claim 1 comprising the steps of:
   providing at least one router, wherein the router is communicably coupled to each stationary detector; and
   relaying the beacon signal of the arbitrary beacon from the proximal detector, through the router, and to the remote server during step (D).

5. The method as claimed in claim 1 comprising the steps of:
   providing the at least one arbitrary beacon as a plurality of arbitrary beacons; and
   simultaneously outputting the current approximate location of each arbitrary beacon with the administrator PC device after step (E).

6. The method as claimed in claim 1 comprising the steps of:
   providing a virtual map of the worksite stored on the remote server; and
   graphically displaying the current approximate location of the arbitrary beacon on the virtual map with the administrator PC device after step (E).

7. The method as claimed in claim 1 comprising the steps of:
   prompting the administrator account to view the location history of at least one specific beacon with the administrator PC device after step (G), wherein the specific beacon is from the plurality of wearable beacons; and outputting the location history of the specific beacon with the administrator PC device, if the location history of the specific beacon is selected to be viewed by the administrator account.

8. The method as claimed in claim 1 comprising the steps of:

providing each wearable beacon with an inertial measurement unit (IMU) module, wherein a plurality of worker-activity profiles is stored on the remote server, and wherein the remote server manages a worker history for each wearable beacon;

tracking motion-and-orientation data with the IMU module of each wearable beacon;

relaying the motion-and-orientation data from the arbitrary beacon, through the proximal detector, and to the remote server, if the beacon signal from the arbitrary beacon is received by the proximal detector during step (C);

comparing the motion-and-orientation data of the arbitrary beacon to each worker-activity profile with the remote server in order to identify at least one matching profile from the plurality of worker-activity profiles; and logging the matching profile into the worker history of the arbitrary beacon with the remote server during step (G), if the matching profile is identified from the plurality of worker-activity profiles.

9. The method as claimed in claim 8 comprising the steps of:

generating an unproductive worker alert for the arbitrary beacon with the remote server, if the matching profile is a motion-and-orientation profile for unproductive worker activity; and outputting the unproductive worker alert for the arbitrary beacon with the administrator PC device.

10. The method as claimed in claim 8 comprising the steps of:

generating a disabled worker alert for the arbitrary beacon with the remote server, if the matching profile is a motion-and-orientation profile for disabled worker activity; and outputting the disabled worker alert for the arbitrary beacon with the administrator PC device.

11. The method as claimed in claim 8 comprising the steps of:

generating a worksite hazard alert for the arbitrary beacon with the remote server, if the matching profile is a motion-and-orientation profile for frenetic worker activity; and outputting the worksite hazard alert for the arbitrary beacon with the administrator PC device.

12. The method as claimed in claim 8 comprising the steps of:

prompting the administrator account to view the worker history of at least one specific beacon with the administrator PC device after step (G), wherein the specific beacon is from the plurality of wearable beacons; and outputting the worker history of the specific beacon with the administrator PC device, if the worker history of the specific beacon is selected to be viewed by the administrator account.

13. The method as claimed in claim 1 comprising the steps of:

providing personal contact information for each wearable beacon stored on the remote server;

prompting the administrator account to enter a universal worker alert with the administrator PC device; and sending the universal worker alert to the personal contact information for each wearable beacon, if the universal worker alert is entered by the administrator account.

14. The method as claimed in claim 1 comprising the steps of:

providing at least one virtual certification stored on at least one specific beacon, wherein the specific beacon is from the plurality of wearable beacons;

prompting to review the virtual certification with the specific beacon; and outputting the virtual certification with the specific beacon, if the virtual certification is selected to be reviewed with the specific beacon.

15. The method as claimed in claim 1 comprising the steps of:

providing the worksite with a plurality of geofenced areas managed by the remote server, wherein each wearable beacon is associated with a corresponding area from the plurality of geofenced areas;

generating an out-of-place worker alert for at least one specific beacon with the remote server after step (E), if the current approximate location of the specific beacon is located outside the corresponding geofenced area of the specific beacon; and outputting the out-of-place worker alert for the specific beacon with the administrator PC device.

16. The method as claimed in claim 1 comprising the steps of:

managing a timecard for each wearable beacon based on the location history for each wearable beacon with the remote server;

prompting the administrator account to view the timecard of at least one specific beacon with the administrator PC device after step (G), wherein the specific beacon is from the plurality of wearable beacons; and outputting the timecard of the specific beacon with the administrator PC device, if the timecard of the specific beacon is selected to be viewed by the administrator account.

17. The method as claimed in claim 1 comprising the steps of:

providing each wearable beacon with a wireless receiver;

receiving the beacon signal of a first beacon with the wireless receiver of a second beacon after step (B), wherein the first beacon and the second beacon are from the plurality of wearable beacons;

receiving the beacon signal of the second beacon with the wireless receiver of the first beacon after step (B); and outputting a proximity worker alert with the first beacon and the second beacon.

* * * * *